US005745642A

United States Patent [19]
Ahn

[11] Patent Number: 5,745,642
[45] Date of Patent: Apr. 28, 1998

[54] SYSTEM TO ADD SELECTIVLEY PERSISTENT RESOURCE DATA TO UNUSED BANDWIDTH OF DIGITAL MOVIE

[75] Inventor: Esteban Ahn, San Francisco, Calif.

[73] Assignee: Broderbund Software, Inc., Novato, Calif.

[21] Appl. No.: 687,698

[22] Filed: Jul. 26, 1996

Related U.S. Application Data

[63] Continuation-in-part of Ser. No. 616,432, Mar. 15, 1996, abandoned.

[51] Int. Cl.$^6$ .............................. H04N 5/76; H04N 7/00; H04N 11/00
[52] U.S. Cl. .............................. 386/95; 348/461; 386/124; 395/615
[58] Field of Search .............................. 395/154, 153; 386/95, 96, 98, 104, 105, 106; 348/552, 423, 461, 464, 465, 473, 474, 476, 477, 478, 479, 480; H04N 5/91, 5/928, 7/04, 7/06, 7/08, 7/52, 7/00, 11/00, 7/084, 7/087

[56] References Cited

U.S. PATENT DOCUMENTS

| | | | |
|---|---|---|---|
| H1589 | 9/1996 | Rosenthal | 395/154 |
| 5,097,348 | 3/1992 | Suetaka | 386/95 |
| 5,107,343 | 4/1992 | Kawai | 395/154 |
| 5,488,409 | 1/1996 | Yuen et al. | 386/83 |
| 5,544,176 | 8/1996 | Fujii et al. | 386/95 |
| 5,550,965 | 8/1996 | Gabbe et al. | 395/154 |

OTHER PUBLICATIONS

Gil Cruz and Ralph Hill, Capturing and Playing Multimedia Events with Streams, 1994, pp. 193–200.

*Primary Examiner*—Thai Tran

[57] ABSTRACT

A method for improving the performance of a multimedia software by interleaving resource and movie data is provided. It is observed that movie data has uneven demand for bandwidth. There are frames of the movie data that utilize less than the bandwidth of some memory devices (e.g., CDROM) or communication networks (e.g., the Internet) and there are frames that require the maximum available bandwidth. One embodiment of the present invention involves interleaving resource data that is not used in the current frame into movie data of this frame if the movie data does not fully utilize the bandwidth. The resource data could be used in subsequent frames during the playing of the movie or after the termination of the movie. In another embodiment of the present invention, the resource data is broken into small pieces. These pieces can be easily interleaved into different frames so as to maximize the use of the transfer rate.

12 Claims, 5 Drawing Sheets

SYSTEM TO ADD SELECTIVLEY PERSISTENT RESOURCE DATA TO UNUSED BANDWIDTH OF DIGITAL MOVIE

CROSS REFERENCE TO RELATED APPLICATIONS

This application is a continuation-in-part application of parent U.S. patent application Ser. No. 08/616,432 filed Mar. 15, 1996, now abandoned.

FIELD OF THE INVENTION

This invention relates to multimedia systems, and more particularly to methods and devices for interleaving resource and movie data so as to fully utilize the available bandwidth in transferring data from storage media or data network into system memory.

BACKGROUND OF THE INVENTION

When computers were first developed, they were very expensive. As a result, only large research institutions and corporations could afford to buy them. Consequently, computers were primarily being used to solve scientific problems (e.g., simulating the behavior of fluid) and support business operations of large corporations (e.g., processing accounting and customer records of insurance companies). The software programs designed for these purposes communicate with users using numbers and text. The users of these software programs were technically trained, and were comfortable in such environment. Thus, there were little needs for these programs to present information in graphic or image forms.

During the past few years, the price of computers decreased drastically. Computers are now purchased by many homes and small businesses. The users of these computers are more comfortable in dealing with multimedia environments involving a combination of graphics, text, image, animation, sound, etc. As a result, various multimedia hardware and software components (such as sound cards, video cards, CDROM readers, game software, educational software, etc.) were rapidly developed. Currently, many computers on the market are sold with a CDROM reader, high quality sound card, and high resolution video card and monitor. These computers are sometimes called "multimedia computers."

In creating multimedia software applications, analog information (such as music and pictures) may need to be digitized and stored as digital data in computer files. One characteristic of multimedia data is that its size is very large when compared to character-based data. As an example, a single 480 by 640 pixel image in 32-bit color has a size of about 1.2 Megabytes ("Mbytes"). A piece of sound of 10 seconds duration could take up half a Mbyte of storage. In contrast, a one page document stored as ASCII text takes just a few kilobytes ("Kbytes").

Because the size of multimedia data is very large, there is a need to use a high density and inexpensive medium to store and distribute multimedia applications. The most widely used medium is CDROM. One CDROM allows more than 650 Mbytes of data to be stored therein. The material and labor costs of pressing one CDROM is a few dollars. Consequently, almost all multimedia applications executable on a computer are now distributed in CDROMs.

CDROM technology arises out of music compact disk ("CD") technology. Thus, the standards for CDROM and CDROM reader are also related to music CD. The basic transfer rate of a CDROM reader is 150 Kbytes per second.

Currently, there are CDROM readers that can achieve a transfer rate of close to ten times the basic transfer rate. The most popular ones have a transfer rate of 300 to 600 Kbytes per second. One problem of this low transfer rate is that it could take an unbearable long time to transfer multimedia information from a CDROM to computer memory.

A similar problem is also encountered in another multimedia delivery environment: data communication network. The most well-known example of a data communication network is the World Wide Web (the "Web"). The Web is one of the communication protocols used in the largest computer network in existence currently, the Internet (which is a worldwide interconnection of millions of computers, from low end personal computers to high-end mainframes). These computers are connected to the Internet using a variety of communication links, such as voice quality analog phone lines, integrated services digital networks (ISDN) lines, T1 lines, etc. Currently, the typical bandwidth of these lines are 28.8 kilobits ("Kbits") per second for analog phone lines, 128 Kbits per second for ISDN lines, and 1,544 Kbits per second for T1 lines. Other telecommunications technologies are being developed to allow faster access to the Internet. One approach is called "Asymmetrical Digital Subscriber Line" (ADSL), which allows 1,500 Kbits per second download and 64 Kbits per second upstream using regular phone lines in homes and businesses. Another approach is to use cable television lines for high speed (about 10,000 Kbits per second) data delivery. In this case, the computers are connected to the cable lines using a product called cable modem.

The Web is a wide-area hypermedia information retrieval system aimed to give universal access to a large universe of documents. When the Web was first developed around 1989, it was known to and used by the academic/research community only as a means for fast disseminating of information. There was no easily available tool which allows a technically untrained person to access the Web. An important development in Internet is the release of a Web "browser" called Mosaic in 1993. It has a simple but powerful graphic interface. The browser allows a user to retrieve web documents and navigate the Web using simple commands and popular tools such as point-and-click. Because the user does not have to be technically trained and the browser is pleasant to use, it has the potential of opening up the Internet to the masses.

A document designed to be accessed and read over the web is called a web page. Each web page must have an address in a recognized format—the URL, or Uniform Resource Locator—that enables computers all over the world to access it. Each web page has an unique URL. A web page typically contains both text and images. It is also possible to include audio and movie data. As pointed out above, multimedia files are large, even when compressed, it could take a long time to retrieve a web page, especially when a voice-quality phone line is used to connect to the Internet.

There are prior art methods that try to solve the above described problems in delivering and playing large amount of digital data. One method of playing multimedia data is to retrieve data (from a CDROM or via a data network) while the data is being played. For some high resolution images requiring several Mbytes of storage, it may take several seconds to retrieve the data. For many multimedia applications, the flow becomes jerky if the images are not updated quickly enough. Because of the low transfer rate of a CDROM reader and the Internet, data may not be retrieved fast enough to keep up with the flow of the images. Thus, the quality of many multimedia applications is less than desired.

Other prior art methods do not use simultaneous delivering and playing of data. Typically, data is retrieved (from a CDROM or via a data network) and loaded into the computer's random access memory ("RAM") prior to playing. When the associated multimedia software is executed, data is supplied from the RAM. Because RAM transfer is many orders of magnitude faster than CDROM or Internet transfer, the performance of this method is the best. However, the amount of data that can be played using this method is limited by the amount of free RAM in the computer system. As a result, this type of methods have only limited applications.

In order to improve the performance of multimedia computer systems, there is a need to develop a new method for providing data to multimedia applications.

SUMMARY OF THE INVENTION

The invention involves interleaving resource data which will be used later with movie data which is used in the current time interval (e.g., a frame). In the context of the present invention, movie data refers generally to time-dependent data, and in particularly to sound, video, and animation data. The movie data is typically stored in a CDROM or transmitted on a data communication network (such as a local area network and the Internet). The transfer rate of CDROM is determined by the CDROM reader used to read the CDROM. The communication rate of a network is determined by many factors, including the bandwidth of the network and the data rate of network access devices (e.g., modems) that couple client computers to the network. In many applications, the amount of movie data needed for a current frame is uneven. Thus, there are flames in which the maximum transfer rate of the CDROM reader or the communication rate of the network is not fully utilized. One aspect of the present invention involves interleaving resource data that is not used in the current frame to the movie data. The resource data could be used subsequently during the playing or termination of the movie. As a result, the transfer rate of the CDROM reader or the communication rate of the network can be more fully utilized.

In one embodiment of the present invention, the resource data is broken into small pieces. These pieces are assigned a first code to identify the data as resource data and a second code to allow an application to assemble the pieces. The pieces can be easily interleaved into movie data so as to maximize the use of the transfer rate.

These and other features of the present invention will become apparent from the following detailed description of the invention read in conjunction with the accompanying drawings.

DETAILED DESCRIPTION OF THE INVENTION

The present invention comprises a novel multimedia system and related methods. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Many multimedia applications use audio extensively. If the audio quality requirement is low, the required transfer rate for delivering audio data to the RAM of a computer is about 10 Kbytes (or 80 Kbits) per second. Many double speed CDROM readers can safely handle about 250 Kbytes per second. Thus, the potential bandwidth of a CDROM reader which is available to transfer other types of data is about 240 Kbytes per second. The data rate for a communication line having a T1 data rate (which could be carried by a cable television line, ADSL, leased line, public-switched telephone network, or local area network) is about 1,544 Kbits per second. Thus, the potential bandwidth of a T1 data rate line which is available to transfer other types of data is about 1,460 Kbits per second. Table 1 shows the potential available bandwidth when sound having various audio quality is played.

TABLE 1

| Audio Quality | Audio Size | CDROM Reader Bandwidth Available to Resource Data | T1 Data Rate Bandwidth Available to Resource Data |
| --- | --- | --- | --- |
| 11 khz 8 bit | 11 Kbytes/s | 239 Kbytes/s | 1,456 Kbits/s |
| 22 khz 8 bit | 22 Kbytes/s | 228 Kbytes/s | 1,368 Kbits/s |
| 44 khz 8 bit | 44 Kbytes/s | 206 Kbytes/s | 1,192 Kbits/s |
| 44 khz 16 bit | 88 Kbytes/s | 162 Kbytes/s | 840 Kbits/s |
| 44 khz 16 bit stereo IMA | 88 Kbytes/s | 162 Kbytes/s | 840 Kbits/s |

One aspect of the present invention is a method to allow data that is not currently used by the multimedia system to "ride" with the data that is being played. The riding data could be graphic or animation data which will be displayed when the playing of the sound segment is completed. Further, the riding data could be program code which may be used by the application currently executing on the computer or other applications that may be invoked later. As can be seen in table 1, most of the bandwidth is available for riding other data while a typical sound segment is played. Thus, a large amount of riding data can be transferred in a given time interval. This riding data improves the performance of the multimedia application because it does not have to be loaded after the playing of the sound segment.

Animation data is typically larger than audio data. However, the size of animation data could undergo a lot of changes during an animation duration. There are time intervals when only a small amount of data needs to be transferred from a CDROM or transmitted by a network. For example, a sprite-based multimedia application may need only a few bytes to draw a new frame. These time intervals can be used to ride other data.

It should be pointed out that Table 1 is used only to illustrate the transfer rates of a specific storage medium and a specific telecommunication data rate. The invention could be used in many kinds of storage media (fixed or removable) that can be attached to a computer. Each storage medium has a different transfer rate, and thus a different available bandwidth. Examples of storage media are hard disks, optical disks (CDROM or DVD), and hybrids (magneto-optical or mini-disc). Further, the invention can be used in all kinds of data networks (including local area network, wide area network and point-to-point network). Again, each kind of network and each kind of network access device has a different bandwidth. Thus, the bandwidth available for resource data would also be different.

In this specification, the implementation of the present invention in a single computer system is first described, followed by a description of the implementation in a network system.

Figure 1:
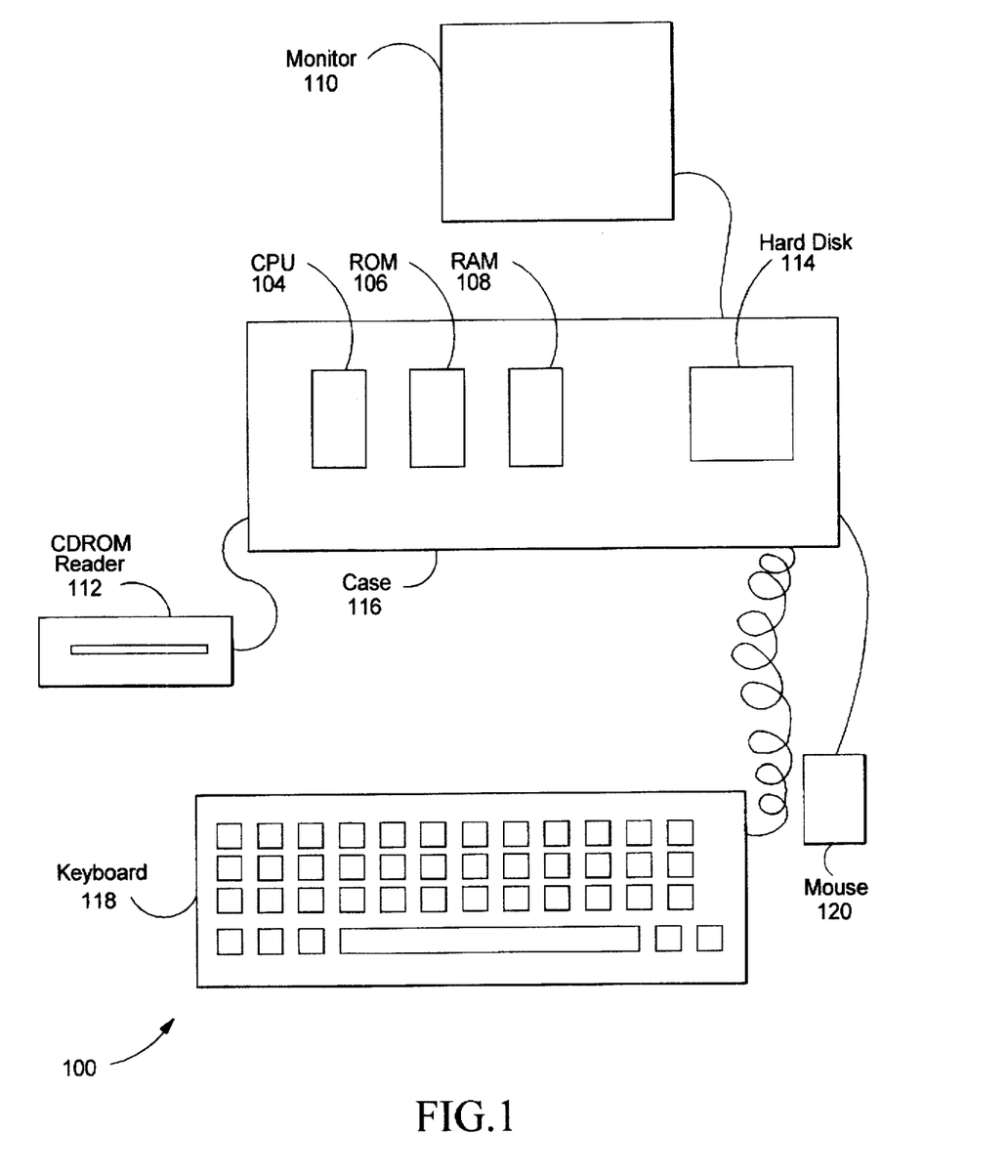
FIG. 1 is a block diagram of a computer system that can be used to implement the method of the present invention.

FIG. 1 is a block diagram of a computer system 100 that can be used to implement the present invention. Computer system 100 contains a CPU 104, read only memory (ROM) 106, RAM 108, a monitor 110, a storage interface device for reading multimedia applications (such as a CDROM reader 112), a hard disk 114, and devices for allowing a user to enter input, such as a keyboard 118 and a mouse 120. A case 116 is used to contain CPU 104, ROM 106, RAM 108 and hard disk 114. In operation, a user inserts a CDROM (not shown) containing software and data incorporating the present invention into CDROM reader 112. Keyboard 118 or mouse 120 is used to cause computer system 100 to execute a desired application associated with the CDROM. Reader 112 transfers data contained in the CDROM into RAM 108 for execution by CPU 104.

Figure 2:
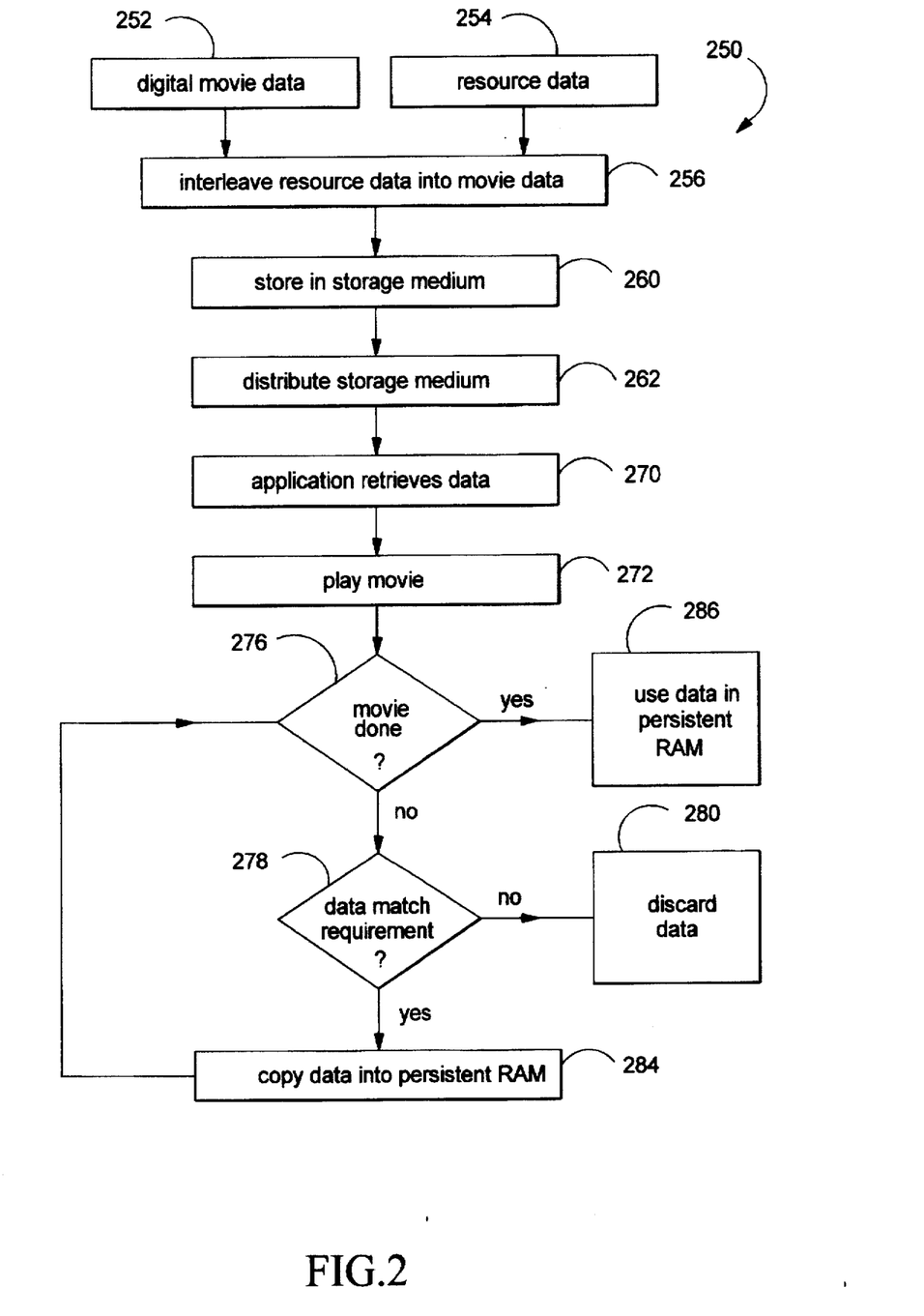
FIG. 2 is a flow chart showing an embodiment of the present invention.

FIG. 2 is a flow chart 250 showing an embodiment of the present invention. Flow chart 250 starts with steps of providing digital movie data (step 252) and resource data (step 254). These two steps can be carried out in any order or simultaneously. In this flow chart, the term "movie data" refers to any time dependent data, such as audio and video data. The video data could arise from images generated by an external video capturing device (such as a camera) or animation generated internally using computer system 100. The term "resource data" refers to any data which is not used in a frame currently displayed on monitor 110, but could be used in future frames or after the termination of the movie.

The resource data obtained from step 254 is then interleaved into the movie data (step 256). The main purpose of interleaving is to make maximum use of the available transfer rate of CDROM reader 112. The interleaving is designed such that the mixture of movie data and resource data would use the full (or close to the full) transfer rate. Thus, during the time interval when the movie data alone does not use the full transfer rate (e.g., during the time interval when there is little change in the image or when only audio is played), resource data can be loaded into RAM 108. As a result, the resource data can be used later without retrieving from the CDROM.

In order to fit a large resource data into the movie data, the resource data could be broken up into small pieces. These pieces will be assembled together when the resource data is used.

In step 260, the interleaved data is recorded into a nonvolatile storage medium (in this example, a CDROM). Copies of the nonvolatile storage medium are then distributed to customers (step 262).

A customer can use an application program to play the movie. The application retrieves the interleaved data from the CDROM (step 270). The movie data is played (step 272). In this embodiment, the movie data is not stored in RAM 108 so as to conserve memory. While the movie is played, the application determines whether the end of the movie is reached (step 276). If the answer is negative, the application determines whether the pieces of retrieved resource data match its requirements and needs, e.g., whether the resource data will be used by this application or other applications (step 278). For those pieces of resource data which causes a positive response (step 284), they are stored into an area of RAM (called persistent RAM) which have been allocated for resource data that will remain in use even after this segment of the movie has finished playing. For those pieces of resource data which cause a negative response, they are discarded (step 280). They are not stored in RAM because RAM is a valuable resource. Flow chart 250 branches to step 276.

If the answer in step 276 is positive (i.e., the movie has finished playing), the resource data stored in persistent RAM is used by the application (step 286). For example, if the movie data is audio data and the resource data loaded into persistent RAM corresponds to a plurality of graphic images, the images can be displayed immediately after the sound segment has been played because the images have already been transferred to RAM. As a result, the performance of the multimedia system is improved.

In another embodiment of the present invention, resource data loaded in one frame may be used by another frame (i.e., prior to the completion of the movie). Thus, when there is a lot of data in a frame, some of the data can be stored as resource data in a previous frame. As a result, there is no need to compromise data in this frame (e.g., by using a compressor having a high compression ratio). Consequently, the performance of the system is improved.

As a means to illustrate the present invention, a specific computer system, an Apple Macintosh-based computer, is used as computer system 100. The Macintosh computer is controlled by an operation system stored in ROM 106 and hard disk 114. It contains many software tools to help software developers to develop multimedia applications. The preferred embodiment of this present invention uses these tools because it is the most efficient way to develop applications. Other kinds of computer systems, such as Microsoft Windows executing on an Intel-based computer, also provide similar tools. They can be used to develop products incorporating the present invention. Alternatively, a developer can develop its own tools.

An exemplary application is an animation application. This application uses a software product named "QuickTime," which is developed by Apple Computer, Inc, as a vehicle to develop and play movie data. QuickTime is a cross-platform streaming video technology. In this application, the term "streaming" means data is loaded as it plays. In order to optimize the performance of a computer, QuickTime loads a little bit ahead of where it is playing.

Most multimedia applications use a codec (compressor/decompressor) to reduce the size of animation, video and graphic data. Quicktime contains several built-in codecs, and also allows developers to substitute their own codec for the built-in codecs.

One codec is a sprite-based codec which stores images of commonly used castmembers in RAM. To draw a castmember at a certain position on monitor 110, the application only needs to input to the codec an identification number for the castmember and the desired coordinate. The total amount of data needed to be downloaded from a CDROM could be just a few bytes instead of several Kbytes of data needed to draw the image of the castmember. Thus, a very high compression ratio can be achieved for a certain type of frames. Consequently, it is possible to ride a lot of resource data in these frames.

Figure 3:
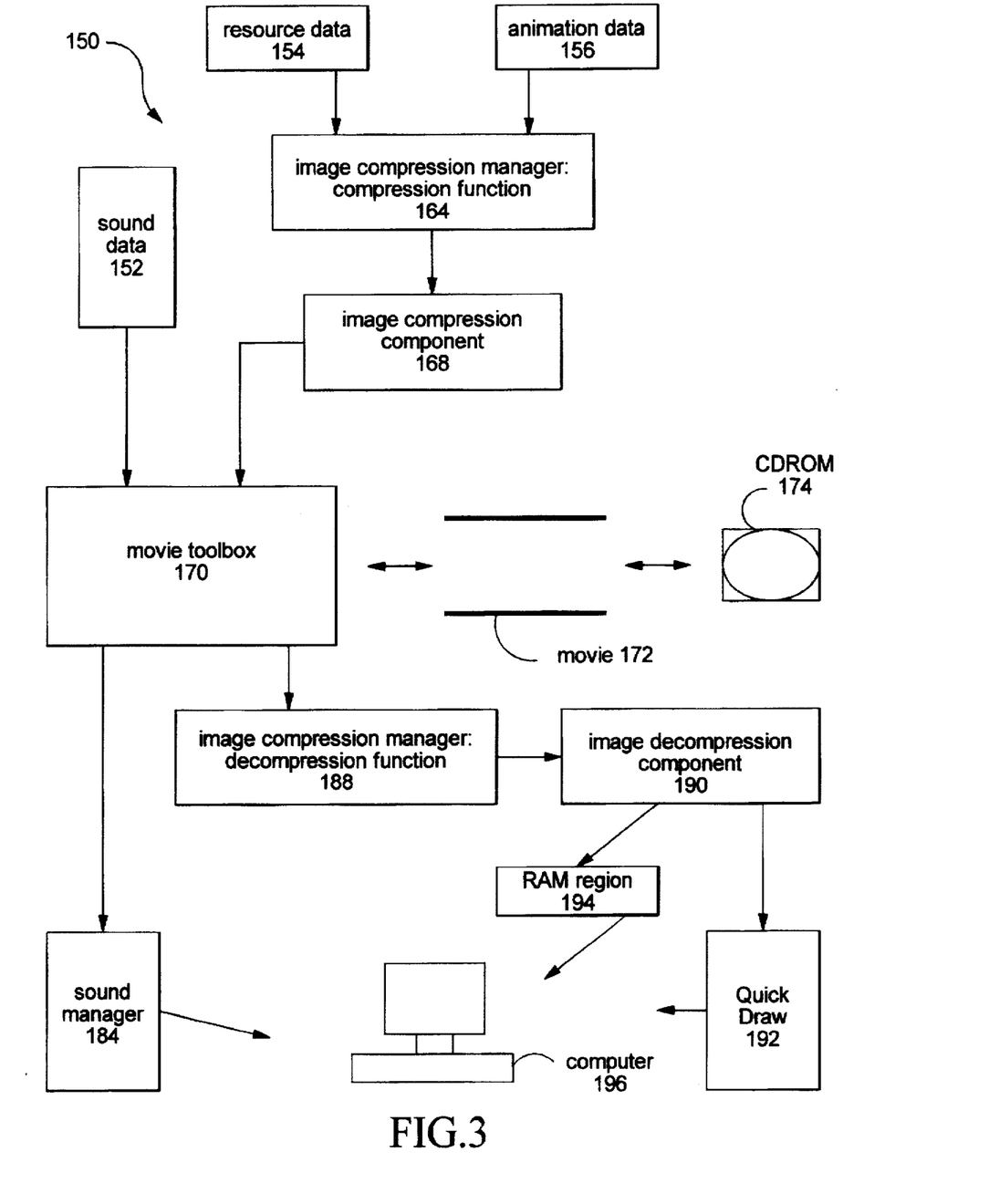
FIG. 3 is a schematic drawing showing an embodiment of the present invention using QuickTime.

FIG. 3 is a schematic diagram of a movie recording and playback system 150 using QuickTime. The details of QuickTime is disclosed in two publications entitled "Inside Macintosh: QuickTime" and "Inside Macintosh: QuickTime Components," both are members of the "Apple Technical Library" and published by Addison-Wesley Publishing Company. These two books are incorporated herein by reference.

In QuickTime, a set of time-based data is referred to as a "movie." This set of data is not restricted to sound or video, but could be financial data, laboratory data or other time-dependent data. Thus, a QuickTime movie is a continuous stream of time-dependent data which may come from different sources.

A QuickTime movie may contain several tracks (e.g., a sound track and video track). Each track represents a single stream of data in the movie and is associated with a single "media." The term "media" refers to a data structure that contains information about data for a track in a movie. Note that the media does not contain its data; rather, a media contains a reference to its data. The media contains control information that refers to the actual movie data. The movie data may be stored on nonvolatile storage devices, such as hard disk, CDROM or floppy disk.

A media specifies a media handler, which is responsible for the details of loading, storing, and playing media data. The media handler can store state information in the media. This information is referred to as "media information." The media information identifies where the media's data is stored and how to interpret that data.

QuickTime contains a plurality of components. A component is a code resource that is registered by a "Component Manager" of a Macintosh computer system. Each component supports a defined set of features and presents a specified application program interface (API) to its client applications. Applications are thereby isolated from the details of implementing and managing a given technology. For example, a software developer can use a compression component to perform compression without having to know how to write codes to implement a compression algorithm.

An important tool provided by QuickTime is a move toolbox, shown as reference numeral 170 in FIG. 3. It provides functions that allow applications to control all aspects of creation and playing of movies in Macintosh computer applications. The following are examples of some of the functions that are useful in the present invention:

(1) NewMovie: creates a new movie in memory.

(2) NewMovieTrack: creates a new movie track.

(3) NewTrackMedia: creates a new media for a track.

(4) NewMovieFromFile: creates a movie in memory from a resource that is stored in a movie file.

(5) ConvertFiletoMovieFile: takes a specified file and converts it to movie file.

(6) StartMovie: starts the movie playing from the current movie time.

(7) AddMediaSample: adds sample data and a description to a media.

(8) GetMediaSample: returns a sample from a movie data file.

In FIG. 3, movie toolbox 170 is used to create a movie 172, which is recorded on CDROM 174. Movie toolbox 170 is also used to retrieve the movie previously recorded on CDROM 174 for playback.

The creation of interleaved data is now described. FIG. 3 shows a piece of sound data 152 which can be inserted into one or more sound tracks of a movie by movie toolbox 170 (e.g., by using an "AddMediaSample" function). FIG. 3 also shows resource data 154 and animation data 158. These two types of data are fed to a compression function 164 of an image compression manager. The image compression manager provides applications with a common interface for compressing and decompressing images and sequence of images (e.g., animation). It also provides several compression and decompression options, thereby allowing developers to choose the appropriate tool for a particular result. Further, it is possible to a developer to use its own codec, if the codecs in QuickTime do not meet the requirements of the developer.

The compression function 164 of the image compression manager compresses images by invoking an image compression component 168. The image compression manager also contains a decompression function 188, which can decompress images during playback by invoking an image decompression component 190. These two components are code resources that present a standard interface to the image compression manager and provide respective image-compression and image-decompression services. Image compression component 168 and image decompression component 190 could be supplied by the developer. An image compression manager data structure called "Code-NameSpec" can be used by developers to identify the name of its codec component.

In the preferred embodiment, codec components especially designed for the present invention are used. These components are designed to compress and decompress (depending on whether a compression or decompression component is used) animation data and process resource data. As explained in detail below, these codec components can identify the resource data and pass it to application programs.

A resource is a piece of data of a specific type. For example, data that comprises a picture is a resource data of type "PICT" while data that comprises ASCII characters is a resource data of type "TEXT." Resources may have identification numbers in addition to type information. For example, resources "PICT 1000" and "PICT 2000" are PICT resources having ID numbers of "1000" and "2000." Further, resources that are large can be broken into small pieces. One aspect of the present invention is that arbitrary groupings of many resources of many different types can be placed in one file. For example, a resource file could contain resources of type "TEXT" along with resources of type "PICT."

Table 2 shows an example of a simple protocol for identifying resource data. The first four bytes of data contain a four-character letter code ("RSRC" in table 2) to indicate that it is a resource data to be interleaved into movie data. Examples of other letter codes are "VIDE" for video and "SOUN" for audio data. Note that the letter codes are user definable. The "RSRC" code serves to distinguish resource data from audio or video data. The next code is a four-byte string used to identify the resource type (e.g., picture, text, program code, etc.). The example in table 2 indicates that the data is a PICT resource. This is followed by a four-byte numeric quantity designating an identification number ("Resource ID") for the data. The next four-byte item (labelled "Total Size" in table 2) is used to indicate the total size of this particular resource. As explained above, large resource could be split into many parts. In the example of Table 2, the resource data is separated into two parts. The next four-byte item is used to indicate the size of each part (in table 2,500 bytes for each part). This is following by a four-byte number designating the part number. The last four-byte number is used to indicate the total number of parts (in this example, two parts).

It should be noted that there are many ways to convey the same or similar information on the resource data. A person skilled in the art can design his/her own protocol without departing from the spirit of the present invention.

TABLE 2

| Frame No. | Kind of data | Type Code | Resource ID | Total Size | Size of this part | This Part # | # of Parts in Total |
|---|---|---|---|---|---|---|---|
| 1 | RSRC | PICT | 1 | 1000 | 500 | 0001 | 0002 |
| 2 | RSRC | PICT | 1 | 1000 | 500 | 0002 | 0002 |

Referring back to FIG. 3, compression function 164 calls an image compression component 168. Compression component 168 reads the four-character code portion of the data, thus can determine whether the data is resource data or movie data. If the data is video or animation data, the data is compressed and then sent to movie toolbox 170. If the data is resource data, the data is cut into small enough pieces for optimal interleaving. These pieces are added to a resource list of data chunks to be interleaved with the movie data. The use of this resource list will be described below.

Figure 4:
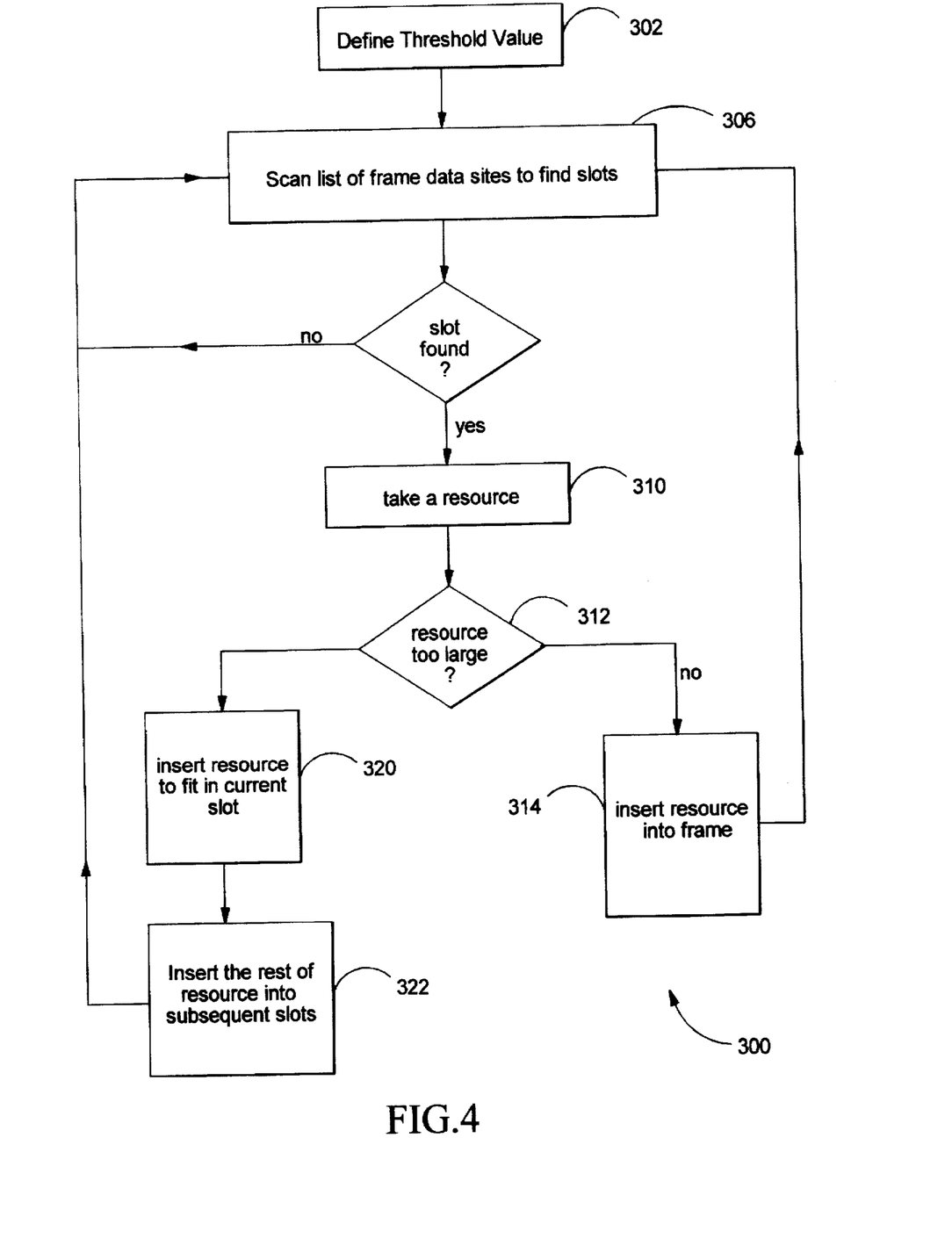
FIG. 4 is a flow chart showing an algorithm for riding resource data on movie data.

FIG. 4 is a flow chart of an algorithm 300 for riding resource data on movie data. In step 302, the user defines a threshold value for a frame data rate at which resource data could ride on a frame. In step 306, algorithm 300 scans a list of frame data sizes of a movie for periods where the data rate is below the user defined threshold. The low data rate periods are called slots. When an available slot is found, algorithm 300 takes a resource from the resource list for inserting into the frame at this slot (step 310). Algorithm 300 then determines whether the resource is too large to fit into the frame (step 312). If the resource is not too large, the resource is inserted into the frame using a QuickTime "AddMediaSample" function (step 314). Algorithm 300 then branches to step 306 to find other slots. If the resource is too large, algorithm 300 adds (again using the "AddMediaSample" function) what will fit into the current slot (step 320) and the rest of the resource to subsequent slots (step 322). Algorithm 300 then branches to step 306 to insert other resource data into other slots.

The playback part of system 150 is now described. Movie toolbox 170 retrieves movie 172 from CDROM 174. It recovers audio data from the sound track in the movie. The audio data is delivered to a sound manager 184, which causes computer 196 to play sound in accordance with the audio data. The resource and animation data is delivered to decompression function 188 of the image compression manager. Decompression function 188 calls image decompression component 190. Component 190 can determine whether the data is resource data or video data based on the four-character letter code embedded in the data. If the code is RSRC, indicating that the data is resource data, decompression component 190 requests the Macintosh operation system to allocate a region 194 of RAM to store the resource data. Different regions of RAM space could be set up to store different resource data (e.g., different pictures could be stored in different RAM spaces). The resource data will be used by the current or other applications. The applications assemble the resource data using the "parts" information embedded in the data, and then process the resource data in accordance with the flow chart shown in FIG. 2. If the data is animation data, the data is routed to Macintosh's Quick Draw routine 192 (or other proprietary drawing routines), which draws an image on computer 196.

It can be seen from the above that the system shown in FIG. 3 is capable of interleaving movie and resource data, and later retrieving and processing them in accordance with the needs of applications associated with the system.

Figure 5:
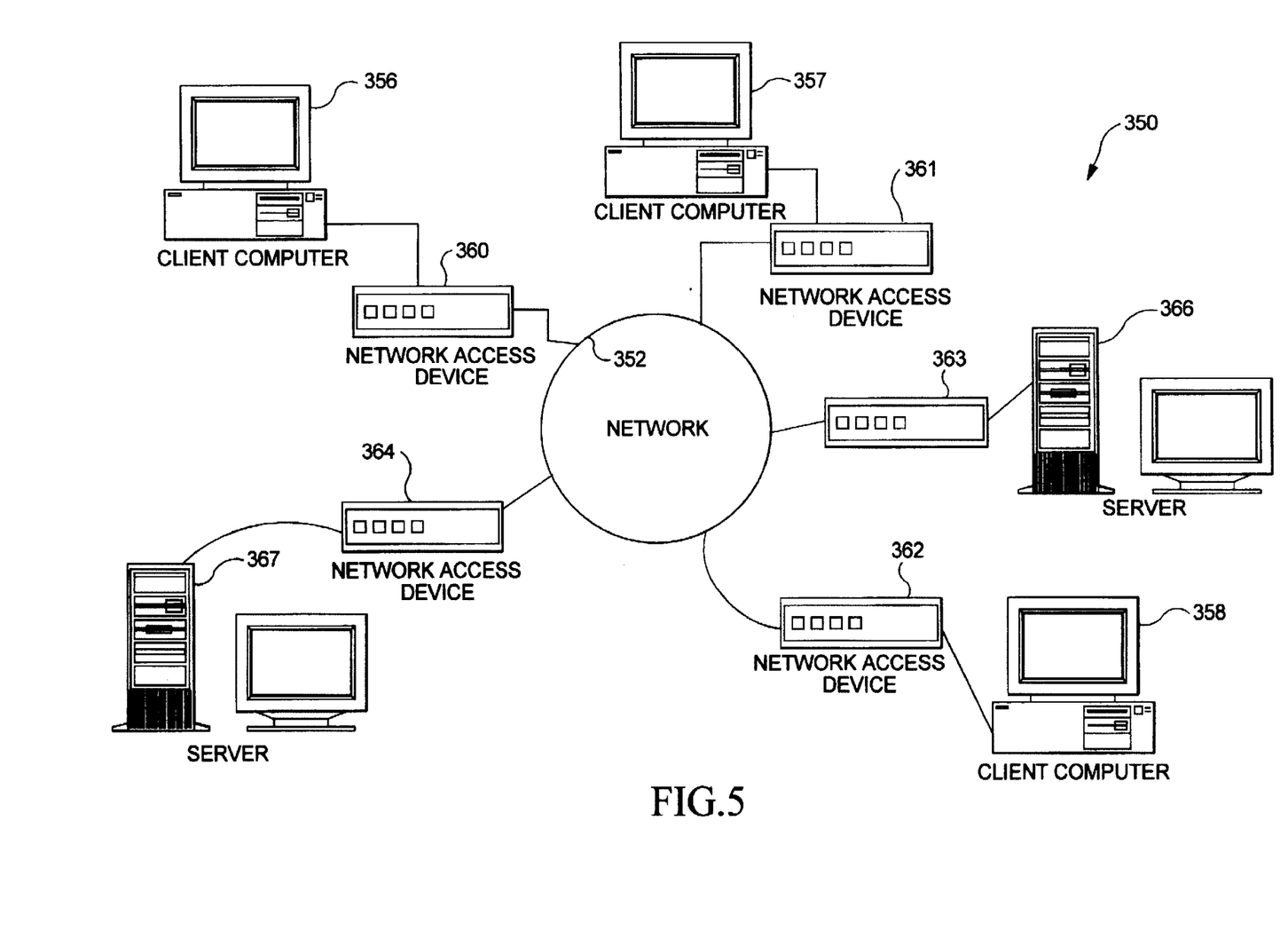
FIG. 5 is a block diagram of a network system that is able to implement the method of the present invention.

The implementation of the present invention in a network system is now described. FIG. 5 is a drawing showing a network system 350 of the present invention. System 350 contains a data communication network 352, which could be a local area network or a wide area network. System 350 also contains a plurality of client computers (such as computers 356–358) and a plurality of server computers (such as servers 366 and 367). These computers are connected to network 352 using a plurality of network access devices 360–364 (such as modems for connecting the client computers to dial-up lines and channel service units for connecting the server computers to T1 lines). Preferably, movie data is stored in the servers. The movie data will be delivered to the client computers either at a predetermined time or upon request. Upon receiving the data, the client computers play the movie.

The structure of the client computers and the servers could be similar to computer system 100 of FIG. 1. Typically, a server is more powerful (in terms of storage capability and processing power) than the client computers. The network access devices are conventional devices for connecting the computers (servers and clients) to the data communication network, and thus will not be described in detail here.

In one embodiment of the present invention, the creation of a movie with interleaved resource data (such as steps 252, 254 and 256 of FIG. 2 and blocks 152, 154, 158, 164, 168, 170 and 172 of FIG. 3) can be performed either at the sites of the servers or at a site outside of network system 350. The movie is then stored in one or more servers. Even though a movie could be created and stored in the site of a client computer, it is generally not the preferred way because the processing power and human resource at client sites are relatively limited.

When a client computer wishes to play a movie, it sends a request, e.g., using a hypertext transport protocol (HTTP) in the Web, to a server which stores the movie. The movie is then transmitted to the requesting client computer. The client computer then plays the movie in accordance with steps 270, 272, 276, 278, 280, 284, and 286 of FIG. 2 and blocks 170, 184, 188, 190, 192 and 194 of FIG. 3.

In another embodiment of the present invention, the interleaving can be performed at the time data is transmitted from a server to network 352. The advantage of this approach is that interleaving can be tailored to the bandwidth available to the server and the requesting client. This could be important because many network access devices can search and negotiate the best data rate available under a certain communication environment (e.g., reduce the data rate when a line is noisy).

The invention has been described with reference to specific exemplary embodiments thereof. Various modification and changes may be made thereunto without departing from the broad spirit and scope of the invention. The specification and drawings are, accordingly, to be regarded in an illustrative rather than a restrictive sense; the invention is limited only by the provided claims.

I claim:

1. A method for recording data on a nonvolatile storage medium and playing said recorded data on a computer, said computer having a reader for reading said nonvolatile storage medium at a predetermined transfer rate and system RAM for temporary storage, said recorded data containing distal movie data and resource data to be used after playing said digital movie data, said method comprising the steps of:

recording said resource data, comprising the steps of:

encoding said digital movie data;

encoding said resource data such that said resource data is distinguishable from said encoded digital movie data;

determining an amount of encoded resource data that can be interleaved into said encoded digital movie data, said amount being related to an amount of encoded digital movie data needed for playing during a predetermined time interval;

interleaving said amount of encoded resource data into said encoded digital movie data; and writing said interleaved data into said nonvolatile storage medium; and playing back said interleaved data, comprising the steps of:

retrieving said interleaved data from said nonvolatile storage medium;

recovering said resource data from said retrieved interleaved data while said digital movie data is played;

loading at least a portion of said recovered resource data in said system RAM; and upon completion of playing said digital movie data, using said loaded resource data.

2. The method of claim 1 wherein said recording step further comprises a step of dividing said resource data into a plurality of pieces.

3. The method of claim 2 wherein said digital movie data is organized in frames, and wherein said interleaving step comprises the step of interleaving said plurality of pieces into a plurality of frames.

4. The method of claim 3 wherein said recovering step comprises the steps of:

regenerating said plurality of pieces from said retrieved interleaved data; and assembling said recovered pieces into said resource data.

5. The method of claim 1 wherein said digital movie data is organized in frames, and wherein said determining step further comprises the step of scanning a list of frame data sizes for each frame.

6. The method of claim 1 wherein said playing back step further comprises the step of discarding a portion of said retrieved resource data which is not used by an application program.

7. A method for communicating digital data via a network access device and for playing said digital data on a computer, said network access device capable of communicating digital data at a predetermined transfer rate, said computer having system RAM for temporary storage, said communicated data containing distal movie data and resource data to be used after playing said movie data, said method comprising the steps of:

encoding said digital movie data;

encoding said resource data such that said resource data is distinguishable from said encoded distal movie data;

determining an amount of encoded resource data that can be interleaved into said encoded distal movie data, said amount being related to an amount of encoded digital movie data needed for playing during a predetermined time interval;

interleaving said amount of encoded resource data into said encoded digital movie data;

communicating said interleaved data using said predetermined transfer rate; and playing back said interleaved data on said computer, comprising the steps of:

recovering said resource data from said communicated interleaved data while said digital movie data is played;

loading at least a portion of said recovered resource data in said system RAM; and upon completion of playing said digital movie data, using said loaded resource data.

8. The method of claim 7 further comprising a step of dividing, prior to encoding, said resource data into a plurality of pieces.

9. The method of claim 8 wherein said digital movie data is organized in frames, and wherein said interleaving step comprises the step of interleaving said plurality of pieces into a plurality of frames.

10. The method of claim 9 wherein said recovering step comprises the steps of:

regenerating said plurality of pieces from said communicated interleaved data; and assembling said recovered pieces into said resource data.

11. The method of claim 7, wherein said digital movie data is organized in frames, and wherein said determining step further comprises the step of scanning a list of frame data sizes for each frame.

12. The method of claim 7 wherein said playing back step further comprises the step of discarding a portion of said communicated resource data which is not used by an application program.

* * * * *